April 30, 1935. H. J. CALDWELL 1,999,180
MACHINE TOOL
Filed April 11, 1931 4 Sheets-Sheet 4

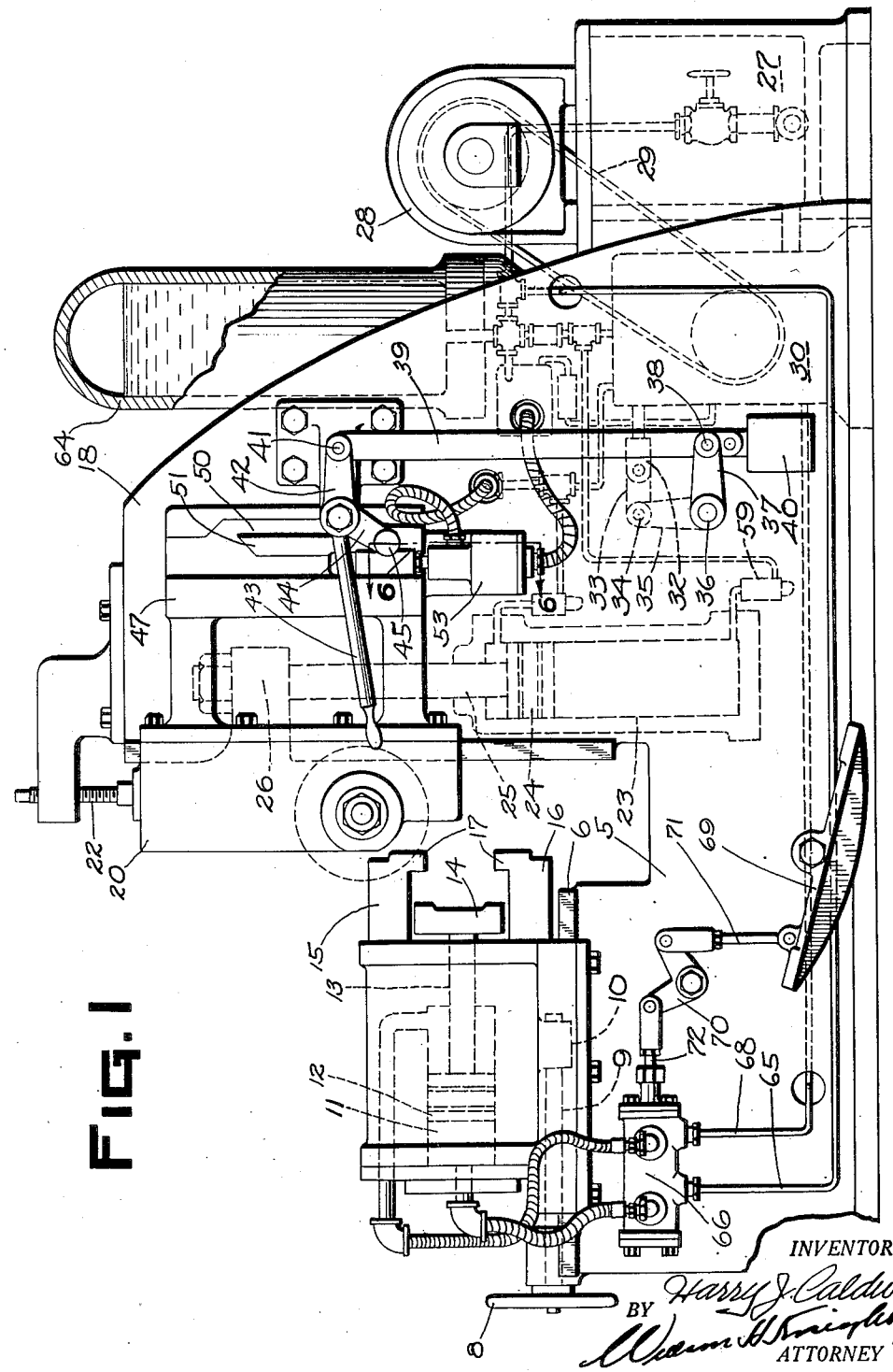

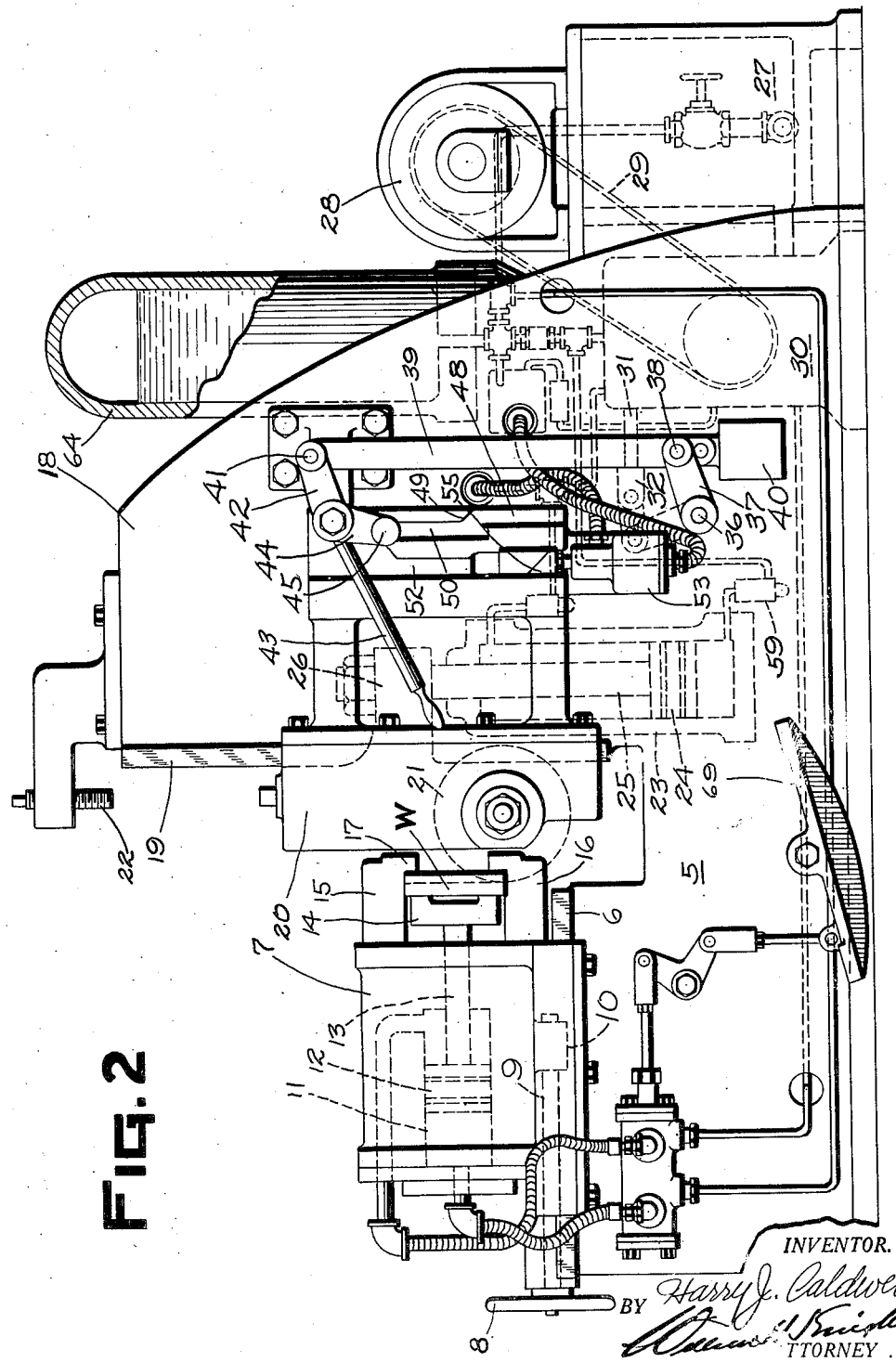

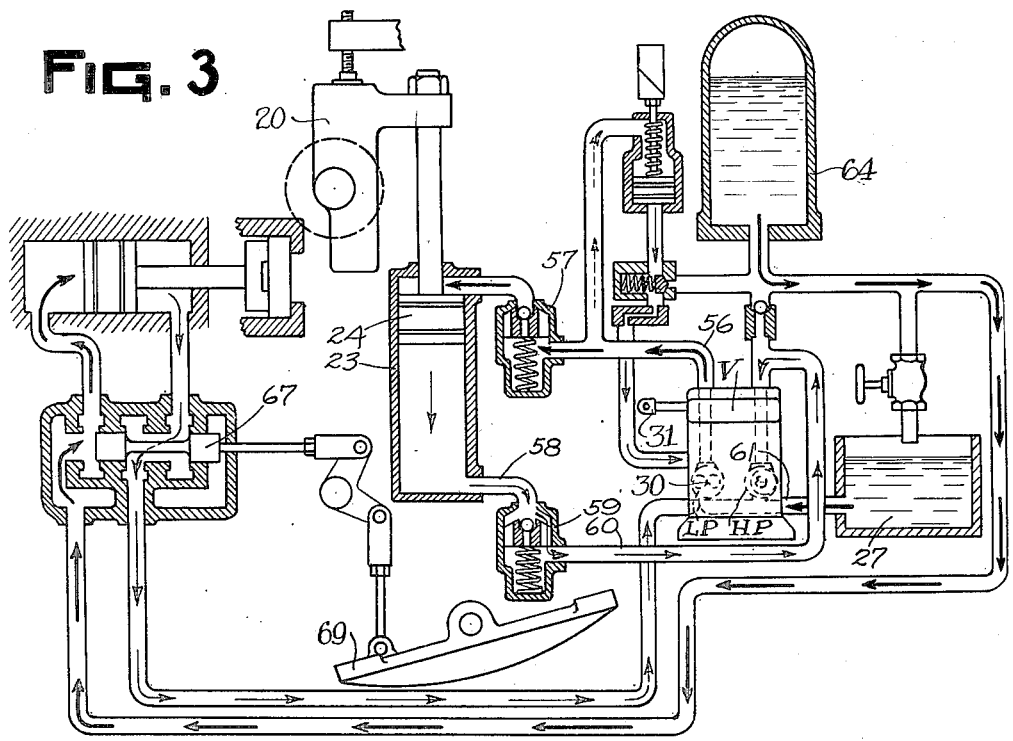
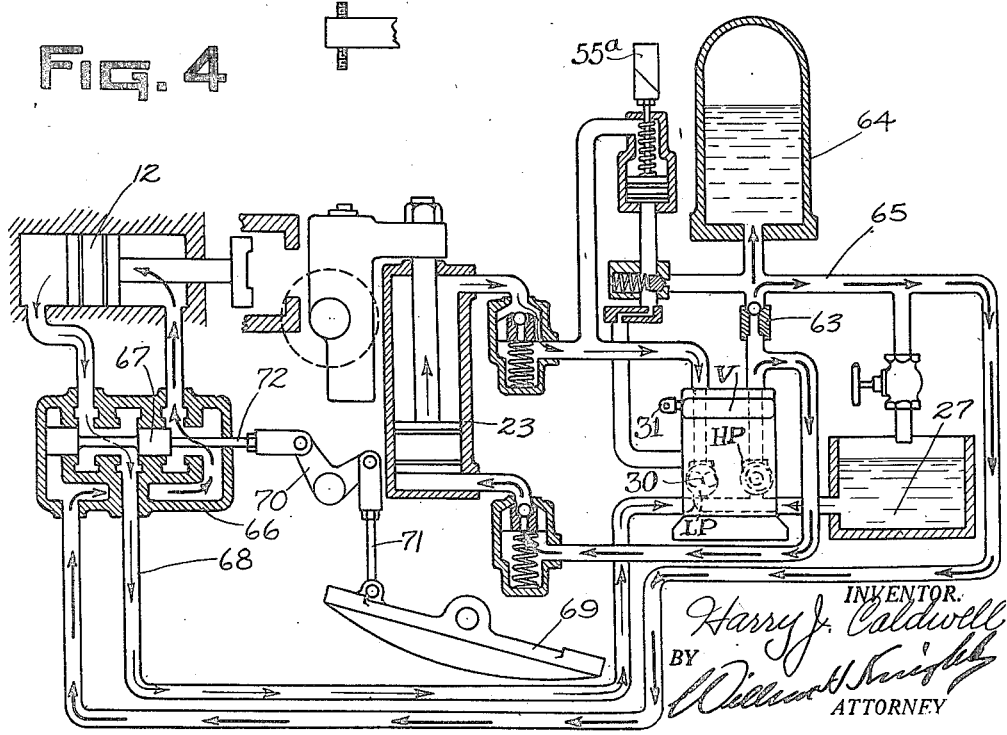

INVENTOR.
Harry J. Caldwell
BY
ATTORNEY.

Patented Apr. 30, 1935

1,999,180

UNITED STATES PATENT OFFICE 1,999,180

MACHINE TOOL

Harry J. Caldwell, Rockford, Ill., assignor to The Ingersoll Milling Machine Company, Rockford, Ill., a corporation of Illinois Application April 11, 1931, Serial No. 529,457

12 Claims. (Cl. 90—21.5)

The present invention relates in general to machine tools and more particularly to those of the type in which a machine element such as the tool head is actuated by fluid pressure operated mechanism.

The primary object of the invention is to provide a machine tool having two machine elements to be actuated and a novel means by which the power driven mechanism for supplying pressure fluid for actuating one of the elements such, for example, as a tool head may be utilized to charge an accumulator by which pressure fluid is supplied to actuate the other machine element.

The invention also resides in the novel manner in which the accumulator is charged with respect to the cyclic operation of the primary machine element.

With these and other objects in view, the invention is exemplified in the combination and arrangement of parts shown in the accompanying drawings and described in the following specification and it is more particularly pointed out in the appended claims.

In said drawings, Figure 1 is a view in side elevation of a machine constructed in accordance with the present invention.

Figure 2 is a view similar to Figure 1, but showing the operating parts in a different position to more fully show the operating cycle;

Figure 3 is a diagrammatic view of the hydraulic circuit and showing the operating parts as they will appear at the commencement of an operating cycle;

Figure 4 is a view similar to Figure 3, but showing the parts as they will appear at another stage in the operating cycle;

Figure 5:
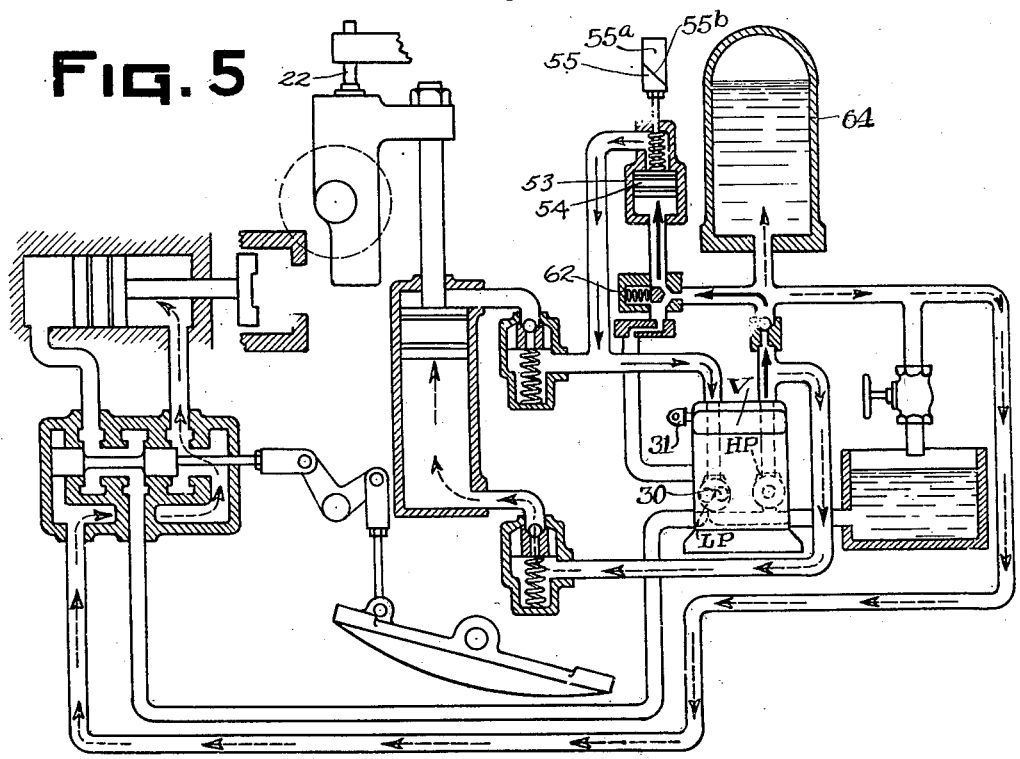
Figure 5 is a view similar to Figures 3 and 4 showing the parts as they will appear in still another stage of the operating cycle.

Referring now to the drawings in detail, 5 represents a base structure on which is provided horizontal ways 6 for the work fixture 7. The fixture may be adjusted back and forth on the ways 6 by means of a manual hand wheel 8 carried on the end of a screw 9 which is threaded in the nut 10 depending on the underside of the fixture 7. The purpose of this hand adjustment for the fixture is to move the work relatively of the cutting tool so as to determine the depth of the cut as an example.

The fixture 7 includes a horizontal cylinder 11 in which is mounted a piston 12 with a rod 13 projecting forwardly and carrying on the end thereof a thrust or pressure block 14. Projecting in advance of the fixture 7 are a pair of parallel arms 15 and 16 which terminate in depending shoulders 17 providing abutments against which the work W is clamped by means of the thrust block 14.

Mounted in front of the fixture assembly is a vertical column 18 having vertical ways 19 upon which the tool head 20 is mounted for translation. The tool head will be equipped with a motor and driving mechanism for the rotary tool 21 which is carried by the head. With the head moved up against the stop 22 in which position it will be at the commencement of an operating cycle of the machine, translation of the head downwardly will pass the tool 21 across the face of the work W and mill a slot in the work whereupon at the completion of the operation, the head will be returned to its starting position against the stop 22.

The means for translating the head preferably comprises a vertical cylinder 23 in which is mounted a reciprocal piston 24, the piston rod 25 of which extends through the top of the cylinder and is securely fixed to a depending lug 26 projecting rearwardly from the back of the head 20.

The work is clamped or held in the work support or fixture by fluid pressure means and the head is translated by fluid pressure means. The control for the fluid pressure means for the work support or fixture is entirely manual whereas the control for the fluid pressure means for translating the head is a combined automatic and manual.

This fluid pressure means includes a suitable source of fluid supply such as a reservoir 27 upon which is mounted an electric motor 28 connected by means of a belt 29 in driving relation with the pump assembly 30. This pump assembly as shown in Figs. 3, 4 and 5 includes high and low pressure pumping elements and a control valve therefor. Such an assembly is well known to the trade and for further reference as to the construction and operation of the same attention is called to publication of bulletins Nos. 941,102 and 41,102, published by the manufacturer, The Oilgear Company, of Milwaukee, Wisconsin, and entitled "Type 'QM–1X5' and 'QMY–1X5' pumps two way automatic variable delivery with two-way rapid traverse". To further identify this pump assembly attention is also invited to Patent No. 1,884,277, issued October 25, 1932. The control for the pump is such that a single valve may be moved back and forth to introduce high pressure in the circuit or a low pressure in the circuit. The valve in this connection is also operable to reverse the direction of the circuits for both the high and low pressure pumps. The valve rod for effecting this control is illustrated as at 31, the end of which carries a clevis 32 for connection with a link 33. This link is pivoted as at 34 to a link 35 which in turn is pivoted as at 36 to a link 37. The end of the link 37 is pivotally connected as at 38 to the operating rod 39. This rod carries a pivoted weight 40 at its lower extremity and at the top the same is pivoted as at 41 to a link 42, the opposite end of which being connected to a manually operable control lever 43. Depending from the connection between the link 42 and the lever 43 is an arm 44 on the end of which is a roller 45. The roller 45 is mounted to travel in a cam groove 46 which is formed in a block 47 carried at the back of the head 20.

To initiate an operating cycle, the lever 43 is pulled down by the operator which will move the roller 45 from the neutral position into alignment with the cam groove 48. The roller traverses this cam groove until the weight 40 moves it to the left into alignment with the groove 50. It traverses this groove until it reaches the beveled end 51 thereof, then the weight 40 kicks the same across the beveled end 51 into alignment with the groove 52. When the roller is moved from its neutral position as shown in Figure 1 into alignment with the groove 48 by pulling down on the lever 43, the cycle is initiated. This moves the pump valve into position to deliver fluid pressure into the circuit from the low pressure pump, thus causing the head to be pulled down with a rapid traverse. When the roller is kicked into the groove 50 by the influence of the weight 40 and also the beveled shoulder 49, the pump valve is operated to change over to the high pressure pump for feeding the head. At this particular time the tool is operating on the work. The head continues to feed down until the roller moves into the groove 52 which reverses the direction of the pressure and also changes over to the low pressure pump whereupon the head is returned with a rapid traverse. The roller traverses the groove 52, and rides upon the incline face of a camming block (to be further described). When the head moves against the stop 22, the pressure is built up in the line to operate a valve 53 which will move the piston 54 thereof against the influence of a spring and impart an upward thrust to the camming block 55. The movement of this block will move the roller to the right viewed from Figure 1, throwing the pump valve into neutral after the accumulator (to be further described) has been charged with a predetermined pressure.

The oil circuit for translating the head is shown in Figures 3 to 5, inclusive, each of the diagrams in these figures showing different stages in the operating cycle, the black arrows indicating delivery and the light arrows indicating return. In Figure 3 the circuit is shown open from the delivery pipe 56 through the foot valve 57 into the top of the cylinder 23. The pressure being introduced behind the piston 24 will move the same downwardly and pull the head down. Both the delivery from the high and lower pressure pumps is made through the pipe 56. The return from the cylinder 23 is through the outlet pipe 58 through the foot valve 59 into the pipe 60. The pump is supplied from the reservoir 27 through the pipe 61. When the valve is reversed, the pipe 60 becomes a delivery pipe and the pipe 56 the return. This is shown in Figure 4 wherein the pressure is being introduced in the lower end of the cylinder to move the piston up and return the head.

In Figure 5 the circuit indicates the head as being moved up against the stop 22 and the pressure has built up sufficiently to open the choke coil 62 to operate the piston valve 53 as previously described. As indicated in Figure 4 when the direction of the pump is reversed to move the head up, and the pipe 60 becomes a delivery pipe, the pressure introduced therein will operate the ball valve 63 to recharge the accumulator 64. The accumulator is used as a source of supply for operating the fluid pressure work clamp.

The pressure from the accumulator as indicated in Figure 4 is delivered through the pipe 65 into the four way valve 66. The piston 67 in this valve will determine the direction of the outlet from the valve so as to move the piston 12 to either clamp the work or unclamp the work. As indicated in Figure 4, the valve 67 is in position to deliver the fluid pressure in front of the piston 12 which will move the same to unclamp the work. When the piston 67 has been moved in a position shown in Figure 3, the delivery is made in back of the piston whereupon it will clamp the work. The return for the accumulator circuit is made through the pipe 68 into the source of supply 27.

The valve 67 is wholly manually controlled by means of a pivoted foot pedal 69 which is connected through a bell crank and a rod 71 to the piston rod 72. By rocking the pedal 69 in position shown in Figure 3, the work will be clamped. By rocking it into position as shown in Figure 4, the work will be unclamped.

Since the fluid pressure fixture is mounted for adjustable movement on the ways 6, the piping from the valve 66 will have to be through flexible pipes. This is also true in the fluid pressure circuit for operating the valve 53, at least so far as the pipes which extend to the piston valve 53 are concerned.

Figure 6:
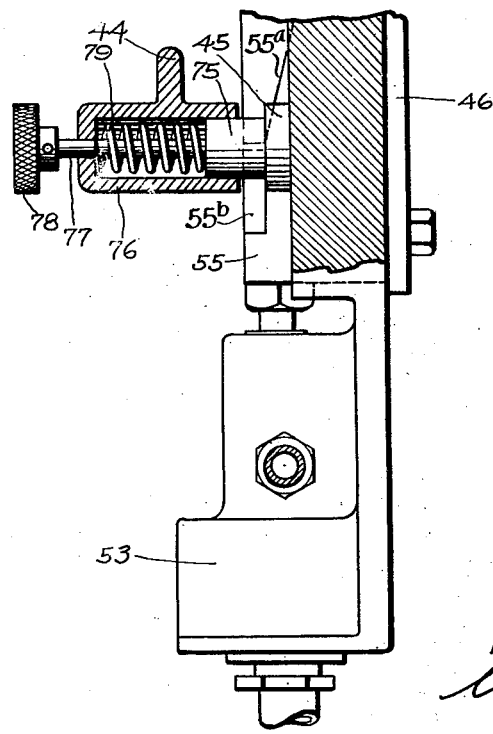
Figure 6 is a detail view in section of the control cam, the section being taken on the line 6—6, Figure 1.

As shown in Figure 6 the roller 45 is made with a cylindrical extension 75 which is fitted into the end of a small housing 76. Connected to the cylindrical extension 75 of the roller is a stem 77 which extends through the closed end of the housing and carries a knurled knob 78. Wound around the stem 77 is a compression spring 79 which holds the roller seated in the grooves of the camming mechanism. Should it be necessary or even desirable for that matter, to stop the operation of the machine at any time during a cycle, the operator may pull out on the knob 78 which will retract the roller 45. The lever 43 may then be moved to set the roller 45 in a neutral position.

The fixture set up shown in the drawings provides for cutting the slots straight across the plate and if it is desired to cut the slot at an angle to the longitudinal axis of the plate, the fixture can be made to hold the work at the proper angle for this purpose.

The operation of the machine is as follows assuming that the parts are positioned as shown in Fig. 1 with the work clamp 14 being retracted and the weight 40 holding the control rod 31 of the main pump valve in neutral position. After insertion of a work blank in the fixture, the lever 69 is depressed thereby connecting the accumulator 64 with the cylinder 11 of the secondary fluid pressure motor to cause the work to be clamped. The cycle of the tool head is initiated by lowering the hand lever 43 which shifts the control rod 31 into a position to connect the low pressure pump to the upper end of the cylinder 23 of the main fluid pressure motor as shown in Fig. 3. Movement of the tool head 20 downwardly at rapid traverse speed is thus initiated, the follower roller 45 then being disposed in the groove 48. As the tool approaches the work piece, the roller 45 encounters the cam surface 49 and is shifted laterally thereby to the groove 50 to move the control rod 31 into a position in which the low pressure pump is disconnected and the high pressure pump is connected to the upper end of the cylinder 23. Downward movement of the tool head continues at feed speed during operation of the cutter on the work piece.

As the roller 45 passes the end of the cam 51, it is shifted further to the left and into the groove 52 whereupon the control rod 31 is moved to a position in which the high pressure pump is disconnected from the cylinder 23 and communication is established between the low pressure pump and the lower end of the cylinder. In this position of the control rod, the accumulator 64 is also connected to the discharged side of the low pressure pump as illustrated in Fig. 4. The movement of the tool head is thus reversed and the head is returned at rapid traverse speed.

In the approach of the tool head to starting position, the roller 45 encounters the cam 55 and rides up the upper inclined end portion 55ª thereof being thereby carried out of engagement with the right hand wall of the groove 52. As this occurs, the movement of the tool head is arrested by the abutment 22 whereupon the fluid delivered in the continued operation of the low pressure pump is diverted into the accumulator thereby building up the pressure therein. When this pressure has been increased to a value predetermined by the setting of the spring loaded valve 62, this valve is opened automatically permitting fluid to flow into the cylinder 53 as indicated in Fig. 5. The resulting movement of the piston 54 carries the inclined surface 55ᵇ of the cam 55 into engagement with the roller 45 thereby shifting the latter to the right onto the top of the cam 51. In this positon, the control rod 31 will be disposed in neutral position and the accumulator 64 and cylinder 23 disconnected from the pump. The cycle is then complete. The pedal 69 may be released to cause unclamping just as soon as the cutter clears the work piece.

From the foregoing, it will be observed that the pump unit by which fluid is supplied to the main hydraulic motor is also utilized as a means for charging the accumulator 64 to the high pressure necessary for effecting a powerful clamping action on the work and at a time when the low pressure pump is not active. The accumulator is charged quickly and without prolonging the operating cycle to an objectionable degree.

Having thus described and shown an embodiment of this invention, what I claim and desire to secure by Letters Patent of the United States is:

1. In a machine tool, a tool head mounted for translation, a fluid responsive motor for translating said head, high and low pressure pumps in circuit with said motor for supplying fluid pressure thereto, a valve in the circuit between the pump and the motor for connecting the low pressure pump with the tool head for initiating the translation of the tool head, control means operable by the translation of the tool head for shifting said valve to connect the high pressure pump with the tool head motor for changing the rate of the translation of the tool head, said control means being operable to shift said valve to reverse the translation of the tool head, a work fixture, a work clamp on the fixture, fluid pressure responsive means for operating said clamp, an accumulator in circuit with the high and low pressure pumps for supplying fluid under pressure to said fluid pressure means operating the work clamp, and valve means operable automatically when the tool head comes to rest at its initial starting position for connecting the accumulator in circuit with one of said pumps for charging the same.

2. In a machine tool, a work fixture, a tool head, fluid pressure responsive means for translating said tool head, a source of fluid pressure supply in circuit with said fluid pressure responsive means, valved means in said circuit for initiating, stopping and controlling the rate of translation of the tool head, a manual control for setting said valved means to initiate the translation of the head, means operable automatically by the translation of the head to control said valved means to change the rate of translation of the head and to stop the head, a fluid pressure responsive work holder on the fixture, a source of fluid pressure supply for operating said holder, a manually controlled valve in the connection between the work holder and the source of fluid pressure supply therefor for operating the work holder and a valve connection between said two sources of fluid pressure supply controlled by the tool head for charging the second named source of supply with fluid pressure from the first named source of supply.

3. In a machine tool, a tool head and work fixture mounted for relative movement, a motor for effecting said movement, a pump for operating said motor, a valve controlling the delivery from the pump, a cam and roller mechanism actuated by the relative movement of the tool head and work fixture for controlling said valve, a fluid pressure accumulator in the pump circuit and means responsive to fluid pressure built up in the pump circuit for actuating the roller of the cam and roller mechanism to close the valve after the pump has charged the accumulator.

4. In a machine tool, a tool head and work fixture mounted for relative movement, a motor for effecting said movement, a pump for operating said motor, a control valve for said pump, means operated by the relative translation of the tool head and work fixture for changing the position of the valve, a fluid pressure responsive work holder on the fixture, an accumulator for operating said work holder, means for holding the valve in a position to establish communication between the pump and accumulator for charging the accumulator and means for closing the valve by the fluid pressure created by the pump after the accumulator is charged.

5. In a machine tool, a tool head and work fixture mounted for relative movement, a motor for effecting said movement, a fluid pressure source for operating said motor, valved means for controlling said motor, means for opening and closing said valve, a fluid pressure responsive work holder on the fixture, a fluid pressure source for operating said work holder, a circuit controlled by said valved means for charging one of said fluid pressure sources with fluid pressure from the other, and means for delaying the closing of the valved means until one of said sources has been charged by the other.

6. A machine tool organization having, in combination, a reciprocable machine element, a fluid pressure motor for actuating said element including a cylinder and a piston therein, power driven pumps for delivering fluid at low and high pressures, a selectively operable valve having a control member movable into different positions to connect said pumps to the ends of said cylinder whereby to cause movement of said element at feed speed when the high pressure pump is active and at rapid traverse speed when the low pressure pump is delivering fluid to the cylinder, an accumulator communicating with said low pressure pump when the latter is connected to one end of said cylinder, means for interrupting the movement of the element by fluid delivered by said low pressure pump whereby to cause said accumulator to be charged in the continued operation of the low pressure pump, means responsive to the building up of a predetermined pressure in said accumulator to operate said valve member and disconnect the low pressure pump and leave said accumulator charged, and an auxiliary fluid pressure motor arranged to be actuated by pressure fluid from said accumulator independently of said pumps.

7. A machine tool organization having, in combination, a reciprocable machine element, a fluid pressure motor for actuating said element, a power driven pump providing a source of pressure fluid, a control valve having a member movable into one position to connect said pump and said motor and cause movement of said element in one direction, said member being movable into a second position in which the pump is connected to said accumulator and to said motor for causing movement of said element in the opposite direction, stop means for limiting the movement of said element in said last mentioned direction whereby to cause said accumulator to be charged in the continued operation of the pump, means responsive to the development of a predetermined pressure in said accumulator to shift said valve member and cause the pump to be disconnected from said motor, and an auxiliary fluid pressure motor adapted to be supplied with pressure fluid from said accumulator and independently of said pump.

8. A machine tool organization having, in combination, a reciprocable machine element, a fluid pressure motor for actuating said element including a cylinder and a piston therein, a power driven pump for delivering fluid under pressure, a valve controlling communication between said pump and the ends of said cylinder, an accumulator connected to said pump automatically as an incident to connection of said pump to one end of said cylinder, means for restraining movement of said element at a predetermined stage in the movement of said element whereby to cause diversion of the pressure fluid to said accumulator until the latter has been charged to a predetermined pressure, and an auxiliary fluid pressure motor arranged to be actuated by pressure fluid from said accumulator when the latter is disconnected from said pump.

9. A machine tool organization having, in combination, a reciprocable machine element, a fluid pressure motor for actuating said element including a cylinder and a piston therein, means including power driven pump providing a source of pressure fluid, a valve controlling the flow of fluid from said source to the ends of said cylinder to cause movement of said element in an automatic cycle away from and back to a predetermined starting position, an accumulator, means operating automatically as an incident to movement of said element back to said starting position to cause pressure fluid to be delivered to said accumulator in the continued operation of the pump, means responsive to the development of a predetermined pressure in said accumulator to disconnect the pump from the accumulator whereby to leave the accumulator charged, and an auxiliary fluid pressure motor arranged to be operated by pressure fluid from said accumulator independently of said pump.

10. In a machine tool organization, the combination of a part to be actuated, a power driven pump for supplying fluid under pressure, a primary fluid pressure motor, an accumulator, a valve movable into a predetermined position to connect said pump with said motor and also with said accumulator whereby to cause movement of said part, means for restraining movement of said part in a predetermined position whereby to cause building up of the pressure in said accumulator, and an auxiliary fluid pressure motor arranged to be supplied with fluid pressure directly from said accumulator independently of said pump.

11. In a machine tool organization, the combination of a part to be actuated, a power driven pump for supplying fluid under pressure, a primary fluid pressure motor, an accumulator, a valve movable into a predetermined position to connect said pump with said motor and also with said accumulator whereby to cause movement of said part, means for interrupting movement of said part by said motor in a predetermined position of the part whereby to cause the pressure fluid delivered by the pump to be discharged into said accumulator, means responsive to the development of a predetermined pressure in said accumulator for actuating said valve to disconnect said pump, and a secondary fluid pressure motor arranged to be actuated by pressure fluid from said accumulator after disconnection of said pump therefrom.

12. In a machine tool organization, the combination of a part to be actuated, a power driven pump for supplying fluid under pressure, a primary fluid pressure motor, an accumulator, a valve controlling the application of pressure from said pump to said motor whereby to cause movement of said part, means operating automatically by movement of said part into a predetermined position to interrupt the movement of the part by the motor and cause the pressure fluid delivered by said pump in the continued operation thereof to build up the pressure in said accumulator, means operable on the development of a predetermined pressure in said accumulator to operate said valve and leave the accumulator charged, and a secondary fluid pressure motor arranged to be actuated by pressure fluid from said accumulator independently of said pump.

HARRY J. CALDWELL.